US012445684B2

(12) United States Patent
Shanmugam et al.

(10) Patent No.: US 12,445,684 B2
(45) Date of Patent: Oct. 14, 2025

(54) CONTENT CATEGORY BASED MEDIA CLIP GENERATION FROM MEDIA CONTENT USING MACHINE LEARNING (ML) MODEL

(71) Applicant: SONY GROUP CORPORATION, Tokyo (JP)

(72) Inventors: Sankar Shanmugam, Bengaluru (IN); Vijayalakshmi Padmanaban, Bengaluru (IN); Balaji Janakiraman, Bengaluru (IN); Abilash Rajarethinam, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 66 days.

(21) Appl. No.: 18/347,911

(22) Filed: Jul. 6, 2023

(65) Prior Publication Data

US 2025/0016411 A1 Jan. 9, 2025

(51) Int. Cl.
*H04N 21/458* (2011.01)
*H04N 21/44* (2011.01)
(Continued)

(52) U.S. Cl.
CPC ..... *H04N 21/458* (2013.01); *H04N 21/44008* (2013.01); *H04N 21/4532* (2013.01);
(Continued)

(58) Field of Classification Search
CPC ........... H04N 21/458; H04N 21/44008; H04N 21/4532; H04N 21/4666; H04N 21/4667; H04N 21/472
See application file for complete search history.

(56) References Cited

U.S. PATENT DOCUMENTS 8,238,672 B2 8/2012 Choi et al.
2017/0171631 A1* 6/2017 Peterson ............ H04N 21/4532
(Continued)

FOREIGN PATENT DOCUMENTS

WO WO-2002062061 A1 8/2002
WO WO-2019183235 A1 9/2019

OTHER PUBLICATIONS

Jin Haojian Haojian@CS CMU EDU et al: "ElasticPlay Interactive Video Summarization with Dynamic Time Budgets", Proceedings of the 25th ACM International Conference on Multimedia, Oct. 19, 2017 (Oct. 19, 2017), pp. 1164-1172, XP058620049, ACMPUB27, New York, NY, USA.
(Continued)

*Primary Examiner* — Randy A Flynn
(74) *Attorney, Agent, or Firm* — CHIP LAW GROUP

(57) ABSTRACT

An electronic device and a method for implementation for content category based media clip generation from media content using machine learning (ML) model is disclosed. The electronic device receives media content having a length of a first time duration. The electronic device receives a second time duration smaller than the first time duration. The electronic device receives a user input indicative of a set of content categories associated with the received media content. The electronic device applies a first machine learning (ML) model on the received media content. The electronic device generates a media clip from the received media content. A length of the media clip generated from the received media content corresponds to the received second time duration. The electronic device renders the media clip generated from the received media content on a display device.

19 Claims, 9 Drawing Sheets

100

Plurality of Media Contents 114

Media Content 114A | Media Content 114B | Media Content 114N

Electronic Device 102

First Machine Learning (ML) Model 110

Second ML Model 112

Communication Network 108

Database 106

104

116

(51) Int. Cl.

| | |
|---|---|
| ***H04N 21/45*** | (2011.01) |
| ***H04N 21/466*** | (2011.01) |
| ***H04N 21/472*** | (2011.01) |

(52) U.S. Cl.

CPC ..... *H04N 21/4666* (2013.01); *H04N 21/4667* (2013.01); *H04N 21/472* (2013.01)

(56) References Cited

U.S. PATENT DOCUMENTS

| | | | | |
|---|---|---|---|---|
| 2017/0177718 | A1 | 6/2017 | Loganathan | |
| 2021/0142066 | A1* | 5/2021 | Jayaram | H04N 21/21805 |
| 2021/0314675 | A1* | 10/2021 | Wang | H04N 21/4884 |
| 2023/0024969 | A1* | 1/2023 | Chandrashekar | H04N 21/4755 |
| 2023/0328323 | A1* | 10/2023 | Jain | H04N 21/44204 725/14 |

OTHER PUBLICATIONS

Vivekraj, et al., "Video Skimming: Taxonomy and Comprehensive Survey", Sep. 21, 2019, vol. 1, No. 1, Oct. 2019, 45 pages.

Kannan, et al., "Improving Video Summarization based on User Preferences", 2013 Fourth National Conference on Computer Vision, Pattern Recognition, Image Processing and Graphics (NCVPRIPG), Dec. 18-21, 2013, 4 pages.

* cited by examiner

CONTENT CATEGORY BASED MEDIA CLIP GENERATION FROM MEDIA CONTENT USING MACHINE LEARNING (ML) MODEL

FIELD

Various embodiments of the disclosure relate to media processing. More specifically, various embodiments of the disclosure relate to content category based media clip generation from media content using machine learning (ML) model.

BACKGROUND

Advancements in the field of information and communication technology have led to generation and distribution of various types of media contents through multiple types of media delivery platforms. For example, typically, a set of media contents may be accessed through an over-the-top (OTT) platform. A user may subscribe to the OTT platform and may consume one or more media contents of the user's choice. However, a media content may have an original length that may be longer than a desired length, which may discourage the user from watching the media content. Further, certain portions of the media content may not be interesting for the users. The users may wish to skip such portions while consuming the media content. The manual skipping of least interesting portions of the media content may degrade a viewing experience of the users and may also lead to a higher user churn rate for the media delivery platforms, such as, the OTT platform.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for content category based media clip generation from media content using machine learning (ML) model is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 7A-7E are diagrams that illustrates an exemplary scenario for generation of media clips of varying second time durations from a received media content, in accordance with an embodiment of the disclosure.

DETAILED DESCRIPTION

Figure 1:
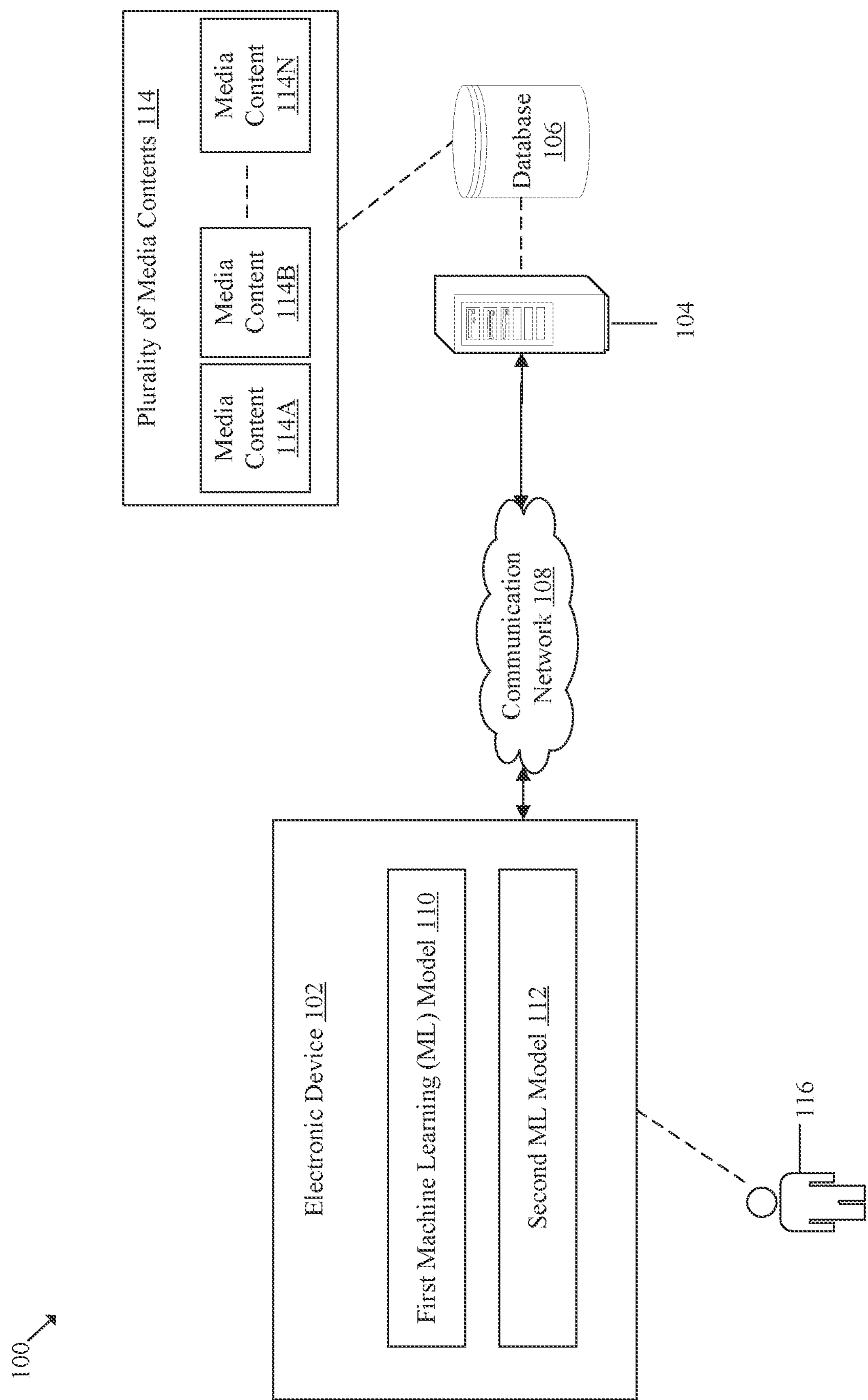
FIG. 1 is a block diagram that illustrates an exemplary network environment for content category based media clip generation from a media content using a machine learning (ML) model, in accordance with an embodiment of the disclosure.

The following described implementation may be found in an electronic device and method for content category based media clip generation from media content using machine learning (ML) model. Exemplary aspects of the disclosure may provide an electronic device that may receive media content having a length of a first time duration. The electronic device may receive a second time duration smaller than the first time duration. The electronic device may receive a user input indicative of a set of content categories associated with the received media content. The electronic device may apply a first ML model on the received media content, based on the received user input. The electronic device may generate a media clip from the received media content, based on the application of the first ML model. A length of the media clip generated from the received media content may correspond to the received second time duration. The electronic device may render the media clip generated from the received media content on a display device.

Typically, a set of media contents may be accessed from an over-the-top (OTT) platform. A user may subscribe to the OTT platform and may view one or more media contents of the user's choice. However, a media content may have a longer than desired length, which may discourage the consumption of the media content by users. Further, certain portions of the media content may not be interesting for the users. The users may wish to skip such portions while consuming the media content. The manual skipping of uninteresting portions of the media content may degrade a viewing experience of the users and may also lead to a higher user churn rate for the media delivery platforms, such as, the OTT platform.

In order to address the aforesaid issues, the disclosed electronic device (such as, the electronic device 102) and method may employ content category based media clip generation from media content using an ML model. The disclosed electronic device 102 may introduce an option for customization of a time duration of the set of media contents. Herein, the disclosed electronic device 102 may clip the received media content from a first time duration to a second time duration based on an application of a first ML model on the received media content. The second time duration may be a desired time duration of the received media content. Further, the electronic device 102 may enable the user to generate the media clip based on an interest of the user. That is, a set of categories such as, songs, fight, and humor, that may be of interest to the user, may be received based on a user input. Thereafter, the disclosed electronic device 102 may generate the media clip that may be in accordance with the received set of categories.

In some embodiment, the disclosed electronic device 102 may generate the media clip further based on local attention values and meta data associated with the media content. Herein, a first view history corresponding to the local attention values of other users and a second view history corresponding to a set of parameters (for example, an age, a location, and a behavior) of the user may be provided as an input to the first ML model to generate the media clip. Such customization of the media content may enhance a viewing experience of the user. Therefore, the user may spend quality time on the OTT platform. Moreover, the aforesaid method of generating the media portion may encourage users to view the received media content. Thus, a number of views of the received media content may rise. Furthermore, a number of subscriptions of the OTT platform may also increase. Also, since manual forwarding of media portions of the received media content may not be needed, the received media content may be viewed in a hassle-free manner by the user. The disclosed electronic device 102 may also recommend a popular media clip of the media content in order to encourage the user to watch the media content completely. Further, the generated media clip may be used for a promotion, a trailer launch, and a nutshell view, of the received media content. Thus, the generated media content clip of a smaller length may also be effectively monetized through advertisements.

FIG. 1 is a block diagram that illustrates an exemplary network environment for content category based media clip generation from a media content using a machine learning (ML) model, in accordance with an embodiment of the disclosure. With reference to FIG. 1, there is shown a network environment 100. The network environment 100 may include an electronic device 102, a server 104, a database 106, and a communication network 108. The electronic device 102 may communicate with the server 104 through one or more networks (such as, the communication network 108). The electronic device 102 may include a first machine learning (ML) model 110 and a second ML model 112. The database 106 may store a plurality of media contents 114. The plurality of media contents 114 may include a media content 114A, a media content 114B, . . . , and a media content 114N. There is further shown, in FIG. 1, a user 116 who may be associated with and/or who may operate the electronic device 102.

The N number of media contents in the plurality of media contents 114 are shown for exemplary purposes and should not be construed to limit the scope of the disclosure. The plurality of media contents 114 may include just two media contents or more than N media contents without departure from the scope of the disclosure.

The electronic device 102 may include suitable logic, circuitry, interfaces, and/or code that may be configured to receive media content such as, the media content 114A, having a length of a first time duration. The electronic device 102 may receive a second time duration smaller than the first time duration. The electronic device 102 may receive a user input indicative of a set of content categories associated with the received media content 114A. The electronic device 102 may apply the first ML model 110 on the received media content, based on the received user input. The electronic device 102 may generate a media clip from the received media content 114A, based on the application of the first ML model 110. A length of the media clip generated from the received media content 114A may correspond to the received second time duration. The electronic device 102 may render the media clip generated from the received media content 114A on a display device associated with the electronic device 102.

Examples of the electronic device 102 may include, but are not limited to, a computing device, a television, a smartphone, a cellular phone, a mobile phone, a tablet computer, a gaming device, a mainframe machine, a server, a computer workstation, a machine learning device (enabled with or hosting, for example, a computing resource, a memory resource, and a networking resource), and/or a consumer electronic (CE) device.

The server 104 may include suitable logic, circuitry, and interfaces, and/or code that may be configured to receive the media content such as, the media content 114A having the length of the first time duration. The server 104 may receive the second time duration smaller than the first time duration. The server 104 may receive the user input indicative of the set of content categories associated with the received media content 114A The server 104 may apply the first ML model 110 on the received media content, based on the received user input. The server 104 may generate the media clip from the received media content 114A, based on the application of the first ML model 110. The length of the media clip generated from the received media content 114A may correspond to the received second time duration. The server 104 may render the media clip generated from the received media content 114A on a display device (for example, a display device of the electronic device 102 or a display device of the server 104).

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the plurality of media contents 114. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for a certain media content (such as, the media content 114A) from the electronic device 102. In response, the device of the database 106 may be configured to retrieve and provide the queried media content to the electronic device 102, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with one another. The communication network 108 may be one of a wired connection or a wireless connection. Examples of the communication network 108 may include, but are not limited to, the Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first ML model 110 may be a regression model which may be trained to identify a relationship between inputs, such as, features in a training dataset and output labels. The first ML model 110 may be applied on the received media content 114A to generate the media clip from the received media content 114A so that the length of the media clip generated from the received media content 114A may correspond to the received second time duration. The first ML model 110 may be defined by its hyper-parameters, for example, number of weights, cost function, input size, number of layers, and the like. The parameters of the first ML model 110 may be tuned and weights may be updated so as to move towards a global minima of a cost function for the first ML model 110. After several epochs of the training on the feature information in the training dataset, the first ML model 110 may be trained to output the media clip.

The first ML model 110 may include electronic data, which may be implemented as, for example, a software component of an application executable on the electronic device 102. The first ML model 110 may rely on libraries, external scripts, or other logic/instructions for execution by a processing device. The first ML model 110 may include code and routines configured to enable a computing device, such as the electronic device 102 to perform one or more operations such as, clipping of the received media content 114A. Additionally, or alternatively, the first ML model 110 may be implemented using hardware including a processor, a microprocessor (e.g., to perform or control performance of one or more operations), a field-programmable gate array (FPGA), or an application-specific integrated circuit (ASIC). Alternatively, in some embodiments, the first ML model 110 may be implemented using a combination of hardware and software.

In an embodiment, the first ML model 110 may be a neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset. Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network, one or more parameters of each node of the neural network may be updated based on whether an output of the final layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The second ML model 112 may be a classification model which may be trained to identify a relationship between inputs, such as, features in a training dataset and output labels. The second ML model 112 may be applied on the received media content 114A to determine category information for each time duration of a set of time durations associated with the received media content 114A. The determined category information may be provided to the first ML model 110. The second ML model 112 may be defined by its hyper-parameters, for example, number of weights, cost function, input size, number of layers, and the like. The parameters of the second ML model 112 may be tuned and weights may be updated so as to move towards a global minima of a cost function for the second ML model 112. After several epochs of the training on the feature information in the training dataset, the second ML model 112 may be trained to output the category information. Further details associated with the second ML model 112 may be same as the details associated with the first ML model 110. Therefore, the description of the second ML model 112 is omitted from the disclosure for the sake of brevity.

The media content 114A may correspond to video associated with a movie, a web-based video content, a streaming show, or the like. The media content 114A may include the set of video frames that may correspond to a set of still images that may be played sequentially to render the video.

In operation, the electronic device 102 may be configured to receive a certain media content (such as, the media content 114A) having the length of the first time duration. Herein, the media content 114A may be a video that may be of interest to the user 116. The first time duration may be an actual length of the received media content 114A. Details related to the reception of the media content are further described, for example, in FIG. 3 (at 302).

The electronic device 102 may be configured to receive the second time duration smaller than the first time duration. The second time duration may be a custom time duration within which the received media content 114A may need to be watched. Details related to the reception of the second time duration are further described, for example, in FIG. 3 (at 304).

The electronic device 102 may be configured to receive the user input indicative of the set of content categories associated with the received media content 114A. The set of content categories may include one or more content categories that the user 116 may wish to watch. For example, the set of content categories may include, songs, fights, actions, humors, and the like. Details related to the reception of the user input are further described, for example, in FIG. 3 (at 306).

The electronic device 102 may be configured to apply the first ML model 110 on the received media content 114A, based on the received user input. Herein, the received media content 114A, the received second time duration, and the set of content categories may be provided as an input to the first ML model 110. Details related to the application of the first ML model are further described, for example, in FIG. 3 (at 308).

The electronic device 102 may be configured to generate the media clip from the received media content 114A, based on the application of the first ML model 110. The length of the media clip generated from the received media content 114A may correspond to the received second time duration. Herein, the electronic device 102 may shorten a length of the received media content 114A from the first time duration to the second time duration to generate the media clip. Further, the media portions corresponding to the set of categories may be retained during generation of the media clip. Thus, the generated media clip may be a customized version of the received media content 114A for the user 116. Details related to the generation of the media clip are further described, for example, in FIG. 3 (at 310).

The electronic device 102 may be configured to render the media clip 310A generated from the received media content on a display device. Upon generation of the media clip, the generated media clip may be displayed on the display device so that the user 116 may consume the generated media clip. Details related to the rendering of the media clip are further described, for example, in FIG. 3 (at 310).

Figure 2:
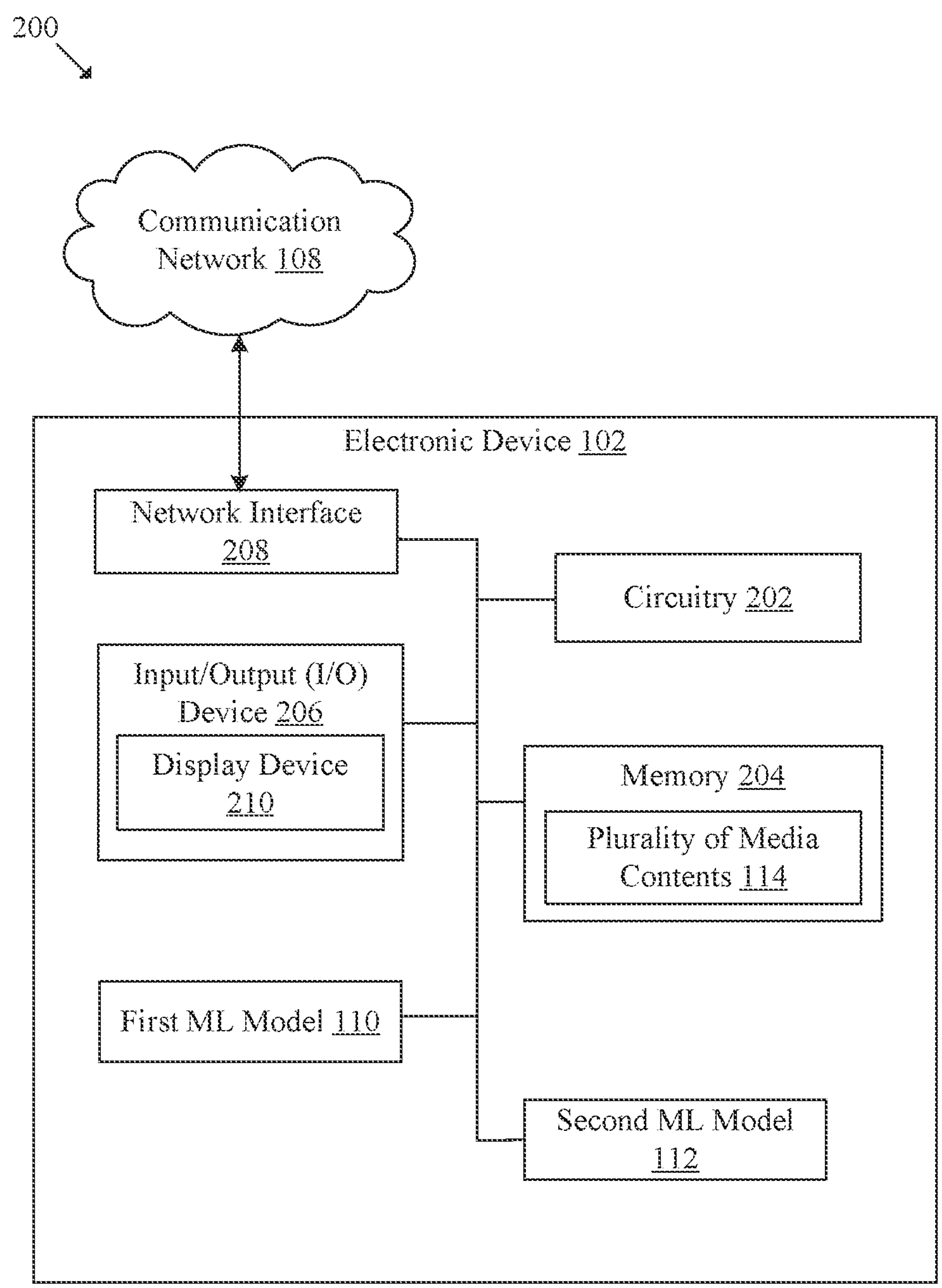
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, a network interface 208, the first ML model 110, and the second ML model 112. The memory 204 may store the plurality of media contents 114. The input/output (I/O) device 206 may include a display device 210.

The circuitry 202 may include suitable logic, circuitry, and/or interfaces that may be configured to execute program instructions associated with different operations to be executed by the electronic device 102. The operations may include media content reception, second time duration reception, user input reception, first ML model application, media clip generation, and media clip rendering. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the set of media contents 114. In an embodiment, the first ML model 110 and/or the second ML model 112 may also be stored in the memory 204. Further, the media clip generated from the received media content (such as, the media content 114A) may also be temporarily stored in the memory 204 to enable seamless rendering of the generated media clip. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a request for clipping of the media content 114A. The I/O device 206 may be further configured to display or render the media clip generated based on the first user input to clip the media content 114A. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the media clip. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for content category based media clip generation from the media content using an ML model are described further, for example, in FIGS. 3 and 4.

Figure 3:
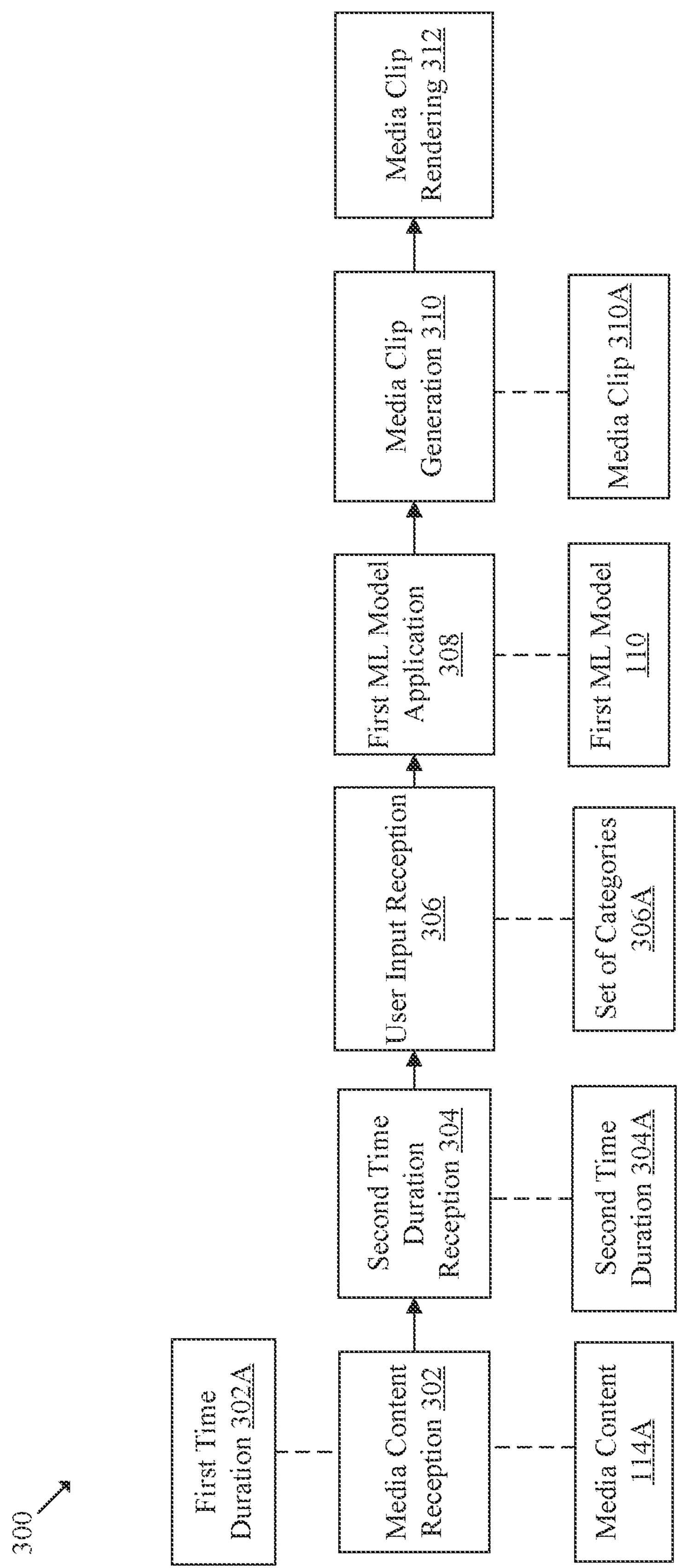
FIG. 3 is a diagram that illustrates an exemplary processing pipeline for content category based media clip generation from a media content using a machine learning (ML) model, in accordance with an embodiment of the disclosure.

FIG. 3 is a diagram that illustrates an exemplary processing pipeline for content category based media clip generation from a media content using a machine learning (ML) model, in accordance with an embodiment of the disclosure. FIG. 3 is explained in conjunction with elements from FIG. 1 and FIG. 2. With reference to FIG. 3, there is shown, an exemplary processing pipeline 300 that illustrates exemplary operations from 302 to 312 for content category based media clip generation from a media content using a machine learning (ML) model. The exemplary operations 302 to 312 may be executed by any computing system, for example, by the electronic device 102 of FIG. 1 or by the circuitry 202 of FIG. 2. FIG. 3 further includes the media content 114A, a first time duration 302A, a second time duration 304A, a set of categories 306A, the first ML model 110, and a media clip 310A.

At 302, an operation of the media content reception may be executed. The circuitry 202 may be configured to receive the media content (such as, the media content 114A) having the length of the first time duration 302A (for example, 12 minutes). Herein, the media content 114A may be a pre-recorded video such as, a movie, a web-based video content, a web-series, a serial, a streaming show, and the like. In an embodiment, the plurality of media contents 114 may be provided on an over-the-top (OTT) platform. The media content 114A may be selected based on a received user input. Upon selection of the media content 114A, the circuitry 202 may retrieve the media content 114A from the database 106 and store the received media content 114A in the memory 204. Alternatively, in case, the media content 114A is already pre-stored in the memory 204, the circuitry 202 may retrieve the media content 114A from the memory 204.

At 304, an operation of the second time duration reception may be executed. The circuitry 202 may be configured to receive the second time duration 304A that may be smaller than the first time duration 302A. For example, the second time duration 304A may be 3 minutes 20 seconds long, while the first time duration 302A may have a length of 12 minutes. The second time duration 304A may be a custom time duration within which the user 116 may want to view the received media content 114A. It may be appreciated that often the length of the received media content 114A may be long. The user 116 may desire to view a concise and useful version of the received media content 114A. In order to do so, in an embodiment, the second time duration 304A may be received based on a user input. For example, a user interface (UI) including one or more UI elements may be displayed on the display device 210. The second time duration 304A may be provided through a UI element of the UI. In an example, the media content 114A may be a movie. The first time duration 302A of the movie may be "1" hour and "30" minutes. The user 116 may desire to view the movie in "30" minutes. Thus, the second time duration 304A corresponding to "30" minutes may be received.

In an embodiment, the circuitry 202 may be further configured to receive a first view history associated with the set of users for the received media content 114A. The received first view history may include a set of user navigation details of the set of users while consumption of the received media content 114A. The set of users may be users that have watched the received media content 114A before the user 116. It may be appreciated that often the received media content 114A may have been already watched certain users before the user 116 wishes to view the received media content 114A. Further, each user of the set of users may have interacted with a UI element associated with a navigation of the received media content 114A based on a preference of the corresponding user. For example, a user may have fast-forwarded an uninteresting media portion of the received media content 114A. Further, the user may have spent more time on another media portion of the received media content 114A that may be associated with action scenes. Similarly, each user of the set of users may have interacted with the UI element associated with the navigation of the received media content 114A while watching the received media content 114A. The set of user navigation details of the set of users while consumption of the received media content 114A may be collected and received as the first view history.

In an embodiment, the circuitry 202 may be further configured to determine one or more popular time durations of the received media content 114A based on the received first view history of the received media content 114A. The received first view history may be analyzed to determine one or more popular time durations. For example, a first subset of users of the set of users may have found a first media portion of the received media content 114A as boring and may have skipped the first media portion. The first subset of users may have completed the movie of length "1" hour and "30" minutes in "1" hour and "15" minutes. Hence, a popular time duration of "1" hour and "15" minutes may be determined. Further, a second subset of users of the set of users may have skipped a second media portion along with the first media portion. The second subset of users may have completed the movie of length "1" hour and "30" minutes in "1" hour. Hence, a second popular time duration of "1" hour may be determined.

Upon determination of the one or more popular time durations of the received media content 114A, the circuitry 202 may be configured to render the determined one or more popular time durations on the display device 210. The reception of the second time duration 304A may be further based on the rendering of the determined one or more popular time durations. The rendering of the determined one or more popular time durations may provide the user 116 with choices for a selection of the second time duration 304A. In an example, the second time duration 304A may be received based on a user input indicative of a selection of a popular time duration from the one or more popular time durations.

In an example, a UI may include a first UI element, a second UI element, and a third UI element. The first UI element may be indicative of a first popular time duration. Further, the first UI element may provide information that the first popular time duration skips "songs" portion of the received media content 114A. The second UI element may be indicative of a second popular time duration. Further, the second UI element may provide information that the second popular time duration skips "action" portion of the received media content 114A. The third UI element may be indicative of a third popular time duration. Further, the third UI element may provide information that the third popular time duration skips an uneventful or boring portion of the received media content 114A. Thus, the user 116 may be provided with an option to select the second time duration 304A from the three popular time durations based on a viewing preference of the user 116.

At 306, an operation of the user input reception may be executed. The circuitry 202 may be configured to receive the user input indicative of the set of categories 306A associated with the received media content 114A. The set of categories 306A may be the content categories that the user 116 may prefer to watch. For example, the set of categories 306A may include, comedy, crime, action, drama, thriller, romance, war, fantasy, animated, adventure, musical, horror, mystery, sport, romance, fantasy, and the like. The set of categories 306A may be received based on a liking of the user 116. In an example, a plurality of content categories that may be associated with the received media content 114A may include comedy, crime, action, drama, thriller, romance, musical, and mystery. The UI including a plurality of UI elements associated with the plurality of content categories may be displayed on the display device 210. The user 116 may prefer to watch the musical and action categories. Thus, the musical and action categories may be selected as the set of categories 306A based on the user input.

At 308, an operation of the first ML model application may be executed. The circuitry 202 may be configured to apply the first ML model 110 on the received media content 114A, based on the received user input. Upon reception of the received user input, the circuitry 202 may feed the second time duration 304A, the set of categories 306A, and the received media content 114A inputs to the first ML model 110. The first ML model 110 may process the set of categories 306A and the received media content 114A in order to generate a media clip of the received media content 114A based on reduction of a length of the media content 114A from the first time duration 302A to the second time duration 304A.

In an embodiment, the circuitry 202 may be further configured to receive a second view history of a first user for a set of media contents. The received second view history includes a set of user navigation details of the first user while consumption of the set of media contents. Herein, the first user may be the user 116 that may be interested in watching the received media content 114A. The set of media contents may be media contents other than the received media content 114A that the first user, such as, the user 116, may have viewed in the past. It may be appreciated that the first user such as, the user 116, may have viewed the set of media contents before watching the received media content. Further, during consumption of each media content of the set of media contents, the user 116 may have interacted with a UI element associated with a navigation of the corresponding media content. For example, the user 116 may have viewed the media content 114B, the media content 114C, and the media content 114D in the past. Therefore, the set of media contents may include the media content 114B, the media content 114C, and the media content 114D. The user 116 may have fast-forwarded a first media portion of the media content 114B when viewing the media content 114B. During consumption of the media content 114C, the user 116 may have fast-forwarded a first media portion of the media content 114C and may have replayed a second media portion of the media content 114C. Herein, the second media portion of the media content 114C may be associated with action scenes. Further, during consumption of the media content 114D, the user 116 may have only watched media portions of the media content 114D that may have been related to actions scenes. In an embodiment, the second view history including the set of user navigation details of the first user (such as, the user 166) during consumption of the set of media contents may collected and stored in the database 106. The circuitry 202 may receive the second view history from the database 106.

Upon reception of the second view history, the circuitry 202 may be configured to train the first ML model 110 based on the received the second view history of the first user. The trained first ML model 110 may be further applied on the received media content 114A. The second view history may include the set of user navigation details of the first user (such as, the user 116) during consumption of the set of media contents. Thus, the second view history may indicate a viewing pattern of the first user (i.e., the user 116), a preference of the first user, a liking and a disliking of the first user, and the like. For example, based on the second view history, it may be determined that the first user likes the an action category and dislikes a mystery category. The first ML model 110 may be trained based on the received the second view history of the first user. The trained first ML model 110 may generate a media clip from the received media content 114A such that media portions associated with the action category of the received media content 114A may be retained and media portions associated with the mystery category of the received media content 114A may be clipped.

At 310, an operation of the media clip generation may be executed. The circuitry 202 may be configured to generate a media clip (e.g., the media clip 310A) from the received media content 114A, based on the application of the first ML model 110. the length of the media clip 310A generated from the received media content 114A may correspond to the received second time duration 304A. Based on the application of the first ML model 110, the received media content 114A may be clipped from the first time duration 302A (e.g., 12 minutes) to the second time duration 304A (e.g., 3 minutes 20 seconds) to determine the media clip 310A. In an example, the set of categories 306A including song category and the action category may be provided as an input to the first ML model 110. Further, the received media content 114A may be provided as an input to the first ML model 110. The first ML model 110 may clip the received media content 114A to determine the media clip 310A. The media clip 310A may include the media portions associated with the song category and the action category. Further, the generation of the media clip 310A may be such that the length of the generated media clip 310A may be equal to (or less than) the second time duration 304A.

In an embodiment, the circuitry 202 may be further configured to receive category information for each time duration of a set of time durations associated with the received media content 114A. A combination of each time duration of the set of time durations may correspond to the first time duration 302A of the received media content 114A. Further, the generation of the media clip 310A from the received media content 114A may be further based on the determined category information. In certain cases, video/movie production houses may provide the category information. Herein, the first time duration 302A of the received media content 114A may be divided into the set of time durations. Further, each time duration of the set of time durations may be manually annotated with a content category. The category information may be provided along with the received media content 114A to the OTT platform. The received category information may be provided as an input to the first ML model 110. The media clip 310A may be generated from the received media content 114A further based on the received category information.

In an example, the set of categories 306A may be received based on the user input. Herein, the set of categories 306A may include the song category and the action category. Further, the category information may be received. The category information may state that the content category for a media portion corresponding to a time duration from "2" minutes to "5" minutes may be a title card. The category information may further state that the content category for a media portion corresponding to a time duration from "5" minutes to "20" minutes may be action. The category information may further state that the content category for a media portion corresponding to a time duration from "20" minutes to "30" minutes may be horror. The category information may further state that the content category for a media portion corresponding to a time duration from "30" minutes to "45" minutes may be song. The category information may further state that the content category for a media portion corresponding to a time duration from "45" minutes to "60" minutes may be action. The received media content 114A, the set of categories 306A, and the category information may be provided as an input to the first ML model 110. The first ML model 110 may clip a media portion between the time duration from "2" minutes to "5" minutes (corresponding to a title category) and a media portion between a time duration from "20" minutes to "30" minutes (corresponding to a horror category) to generate the media clip 310A. The generated media clip 310A may be of the second time duration 304A.

In an embodiment, the circuitry 202 may be further configured to apply the second ML model 112 on the received media content 114A. The circuitry 202 may be further configured to determine category information for each time duration of a set of time durations associated with the received media content 114A based on the application of the second ML model 112. The generation of the media clip from the received media content 114A may be further based on the determined category information. It may be appreciated that in some situations, production houses may not provide the category information. In such cases, the category information may be determined based on the application of the second ML model 112 on the received media content 114A. Herein, the second ML model 112 may be a pre-trained ML model. The received media content 114A may be provided as an input to the second ML model 112 to determine the category information.

In an embodiment, the category information may include a content category for each time duration of the set of time durations, and the content category is at least one of humor, title card, end credit, song, or action. Herein, the second ML model 112 may analyze the received media content 114A. Further, the second ML model 112 may split the received media content 114A into the set of time durations, such that, a combination of each time duration of the set of time durations may correspond to the first time duration of the received media content 114A. Upon splitting of the received media content 114A into the set of time durations, the second ML model 112 may categorize media portions associated with each time duration of the set of time durations. That is, the second ML model 112 may assign a content category to the media portions associated with each time duration of the set of time durations to determine the category information. The determined category information may be provided to the first ML model 110 for generation of the media clip 310A.

In an embodiment, the generation of the media clip 310A from the received media content 114A may be further based on the received first view history of the received media content 114A. Herein, the first view history may include the set of user navigation details of the set of users while consumption of the received media content 114A. The set of users may be users that have watched the received media content 114A before the user 116 watches the received media content 114A. The first ML model 110 may analyze the received first view history of the received media content 114A to generate the media clip 310A. In an example, the received first view history may indicate that the set of users may have fast-forwarded an uninteresting first media portion of the received media content 114A. Thus, the first ML model 110 may clip the received media content 114A such that, the generated media clip 310A excludes the first media portion of the received media content 114A.

In an embodiment, the circuitry 202 may be further configured to receive the first view history of a set of users for the received media content 114A. The received first view history includes a set of user navigation details associated with the set of users while consumption of the received media content 114A. The set of users may be users that may have watched the received media content 114A before the user 116 watches the received media content 114A. It may be appreciated that often the received media content 114A may have been watched by a number of people in past before the user 116 wishes to view the received media content 114A. Further, each user of the set of users may have interacted with a UI element associated with a navigation of the received media content 114A based on a preference of the corresponding user. The user navigation detail associated with each user may be collected while consumption of the received media content 114A by the corresponding user. The user navigation detail associated with each user may be stored in the database 106 to form the set of user navigation details. The circuitry 202 may retrieve the set of user navigation details from the database 106.

The circuitry 202 may be further configured to receive a second view history of a first user for a set of media contents.

The received second view history of the first user includes a set of user navigation details associated with the first user while consumption of the set of media contents. Herein, the first user may be the user 116 that may be interested in watching the received media content 114A. The set of media contents may be media contents other than the received media content 114A that the first user such as, the user 116, may have viewed in the past. Further, during consumption of each media content of the set of media contents, the user 116 may have interacted with a UI element associated with a navigation of the corresponding media content. The user navigation detail associated with the first user during consumption of each media content of the set of media contents may be stored in the database 106 to form the second view history. The circuitry 202 may retrieve the second view history from the database 106.

The circuitry 202 may be further configured to determine a set of parameters associated with the first user based on the received second view history of the first user. The circuitry 202 may analyse the received second view history of the first user to determine the set of parameters. For example, based on the analysis of the received second view history of the first user, the circuitry 202 may determine that the first user prefers watching songs and actions. Further, the circuitry 202 may determine that the first user dislikes portions of the media contents corresponding to horror, title card, and humour.

In an embodiment, the set of parameters associated with the first user may include at least one of a media consumption behavior of the first user, a gender of the first user, an age of the first user, or a location of the first user. The media consumption behavior may indicate a behavioral pattern of the first user, a liking of the first user, and a disliking of the first user. For example, the media consumption behavior of the first user may indicate the content categories of the media portions that the first user may have viewed in the past. The media consumption behavior of the first user may also indicate the content categories of the media portions that the first user may have fast-forwarded in the past. Further, it may be appreciated that based on the gender of the first user, the age of the first user, or the location of the first user, the first user may prefer to watch certain content categories more over others. Thus, the gender of the first user, the age of the first user, or the location of the first user may be taken into consideration in the generation of the media clip 310A.

The circuitry 202 may be further configured to determine weight information associated with the received first view history of the set of users for the received media content 114A, based on the determined set of parameters. The generation of the media clip 310A from the received media content 114A may be further based on the determined weight information. In an embodiment, the circuitry 202 may determine a subset of the set of users such that a set of parameters associated with the subset of the set of users may be similar to the determined set of parameters of the first user. Further, the circuitry 202 may extract a third view history from the received first view history. The third view history may be associated with the subset of the set of users. The third view history may be provided to the first ML model (such as, a first ML model 608 of FIG. 6). The first ML model 608 may generate the media clip 310A from the received media content 114A further based on the third view history. Thus, the generated media clip 310A may be in accordance with a preference of the first user. The generation of the media clip based on the preference of the first user is described further, for example, in FIG. 6.

In an embodiment, the generation of the media clip 310A from the received media content 114A may be further based on at least one of a selection of a media portion from the received media content 114A, a removal of a media portion from the received media content 114A, a fast-forwarding of a media portion of the received media content 114A, or a rewinding of a media portion of the received media content 114A. The media portions associated with the set of content categories may be selected. The media portions that may be disassociated with the set of content categories may be removed. For example, certain media portions that may be slow, boring, or uneventful may be fast-forwarded or removed based on the first view history and/or the second view history. Further, media portions that may be of interest for the user 116 may be re-winded or selected to generate the media clip 310A.

In an embodiment, the circuitry 202 may be further configured to determine a description of a media portion of the received media content 114A. The circuitry 202 may be further configured to embed the determined description in the media clip generated from the received media content 114A. Herein, the media portion may be a least interesting portion of the received media content 114A that may have been removed, cut off, or fast-forwarded in the generated media clip 310A.

In an embodiment, the media portion may correspond to a portion of the received media content 114A that is excluded in the media clip 310A generated from the received media content 114A. That is, the media portion may be the portion of the received media content 114A that may have been removed or cut-off in the generated media clip 310A. It may be appreciated that often when the media portion is excluded from the media clip 310A, certain context or important scenes associated with the media portion may be missed during consumption of the generated media clip 310A. Thus, a viewing experience of the user 116 may be impacted adversely. In order to address the aforesaid issues, the description of the media portion of the received media content 114A may be determined. In an example, the description of such media portions may be determined by use of application of computer vision techniques on the media portions. The determined description of the media portion may be embedded in the media clip generated from the received media content 114A so that the user 116 may grasp the missed context associated with the excluded media portion during consumption of the received media content 114A. In an embodiment, a desired start portion and a desired end portion may be selected from the media content to avoid video or audio glitches.

In an embodiment, the description of the media portion may be at least one of a textual description or an audio description of the removed media portion. Herein, the textual description may summarize the missed context associated with the media portion in a textual form. The audio description of the removed media portion may summarize the missed context associated with the removed media portion in an audio form. However, an amplitude of the audio description may be smaller than an existing amplitude of audio associated with the generated media clip 310A. In an example, one such media portion may be from a time stamp "30" minutes to a time stamp "45" minutes in the received media content 114A. The media portion from the time stamp "30" minutes to the time stamp "45" minutes may be excluded in the generated media clip 310A. However, the media portion may depict certain scenes that may be necessary to understand a plot of the received media content 114A. Therefore, a description of the media portion may be embedded to media portions that may be associated with the time stamps beyond the time stamp "45" minutes in the generated media clip 310A.

At 312, an operation of the media clip generation may be executed. The circuitry 202 may be configured to render the media clip 310A generated from the received media content 114A on the display device 210. In an example, the generated media clip 310A may be uploaded on the OTT platform. A UI of the OTT platform may be displayed on the display device 210. The UI may include a UI element associated with a play-back of the generated media clip 310A. The UI element may be selected to play the generated media clip 310A.

The disclosed electronic device 102 may be used for recommendation of a popular media clipping of the received media content 114A to encourage the user 116 to watch the received media content 114A completely. Further, the generated media clip 310A may be used for a promotion, a trailer launch, and a nutshell view, of the received media content 114A. The disclosed method of generation of a media clipping from a media content may be beneficial to owners of the OTT platforms. As the generated media clip 310A may include interesting portions of the main media content 114A, the user 116 may be more inclined to watch the generated media clip 310A. Hence, it may be of great economic value to place targeted advertisements within the generated media clip 310A. Also, a feature to generate the media clip 310A from the received media content 114A may encourage the user 116 to view other media contents on the OTT platform. Thus, a greater number of users may be encouraged to subscribe the OTT platform. The disclosed method may be beneficial to production houses that produced full length movies or documentaries. A feature to generate a short interesting media clip from a long media content may encourage the user 116 to watch the full length media content, as the user 116 may get an upfront idea of what to expect in the full length media content. Thus, a number of views of the full length media contents may increase. Hence, the production house may be able to fetch greater revenue based on the increase of the number of views. Moreover, in some cases, in order garner an increased number of views for the received media content 114A, the production house may re-release the received media content 114A based on a release of the generate media clip 310A. Herein, the media clip 310A may be generated based on the first view history.

Figure 4:
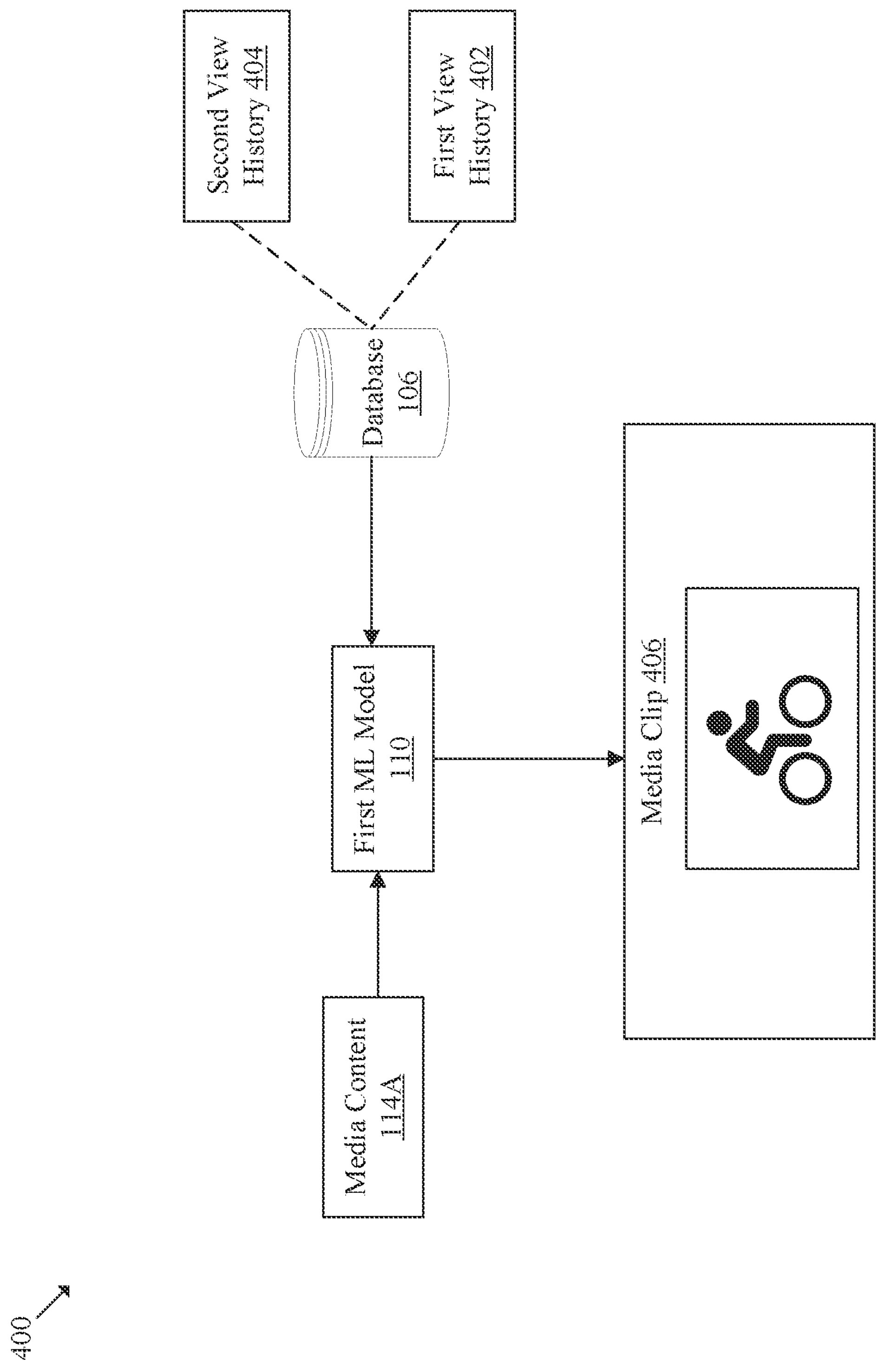
FIG. 4 is a diagram that illustrates an exemplary scenario for generation of a media clip from a media content based on a first view history and a second view history, in accordance with an embodiment of the disclosure.

FIG. 4 is a diagram that illustrates an exemplary scenario for generation of a media clip from a media content based on a first view history and a second view history, in accordance with an embodiment of the disclosure. FIG. 4 is described in conjunction with elements from FIG. 1, FIG. 2, and FIG. 3. With reference to FIG. 4, there is shown an exemplary scenario 400. The scenario 400 may include a first view history 402, a second view history 404, a media clip 406, the database 106, the media content 114A, and the first ML model 110. A set of operations associated the with scenario 400 is described herein.

With reference to FIG. 4, the first view history 402 may be associated with a set of users for the received media content 114A. Herein, the set of users may be users that may have already consumed the received media content 114A. The first view history 402 may include the set of user navigation details of the set of users while consumption of the received media content 114A. The first view history 402 may be stored in the database 106.

With reference to FIG. 4, the second view history 404 may be associated with a first user, such as, the user 116, for a set of media contents may be stored in the database 106. Herein, the set of media contents may be the media contents that the user may have already consumed. Thus, the set of media contents may not include the received media content 114A that the user 116 may not have viewed yet. The second view history 404 may include the set of user navigation details of the user 116 while consumption of the set of media contents.

With reference to FIG. 4, the first ML model 110 may be trained based on the received the second view history 404 of the user 116. Thereafter, the received media content 114A and the first view history 402 may be provided as inputs to the first ML model 110. Upon application of the first ML model 110 on the received media content 114A and the first view history 402 the circuitry 202 may generate the media clip 406.

It should be noted that the received media content 114A may have a length of a first time duration. In an embodiment, a second time duration smaller than the first time duration may be further received. Herein, the second time duration may be a desired length of the media clip 406 to be generated from the received media content 114A. In such case, the circuitry 202 may generate the media clip 406 further based on the received second time duration.

With reference to FIG. 4, as the media clip 406 is generated based on the second view history 404, the generated media clip 406 may be customized based on a preference of the user 116. Moreover, as the media clip 406 is generated further based on the first view history 402, the generated media clip 406 may be further customized based on the media portions of the received media content 114A that may have been watched by the set of users and the media portions of the received media content 114A that may have been skipped by the set of users. Therefore, a viewing experience of the user 116 may be enhanced.

It should be noted that scenario 400 of FIG. 4 is for exemplary purposes and should not be construed to limit the scope of the disclosure.

Figure 5:
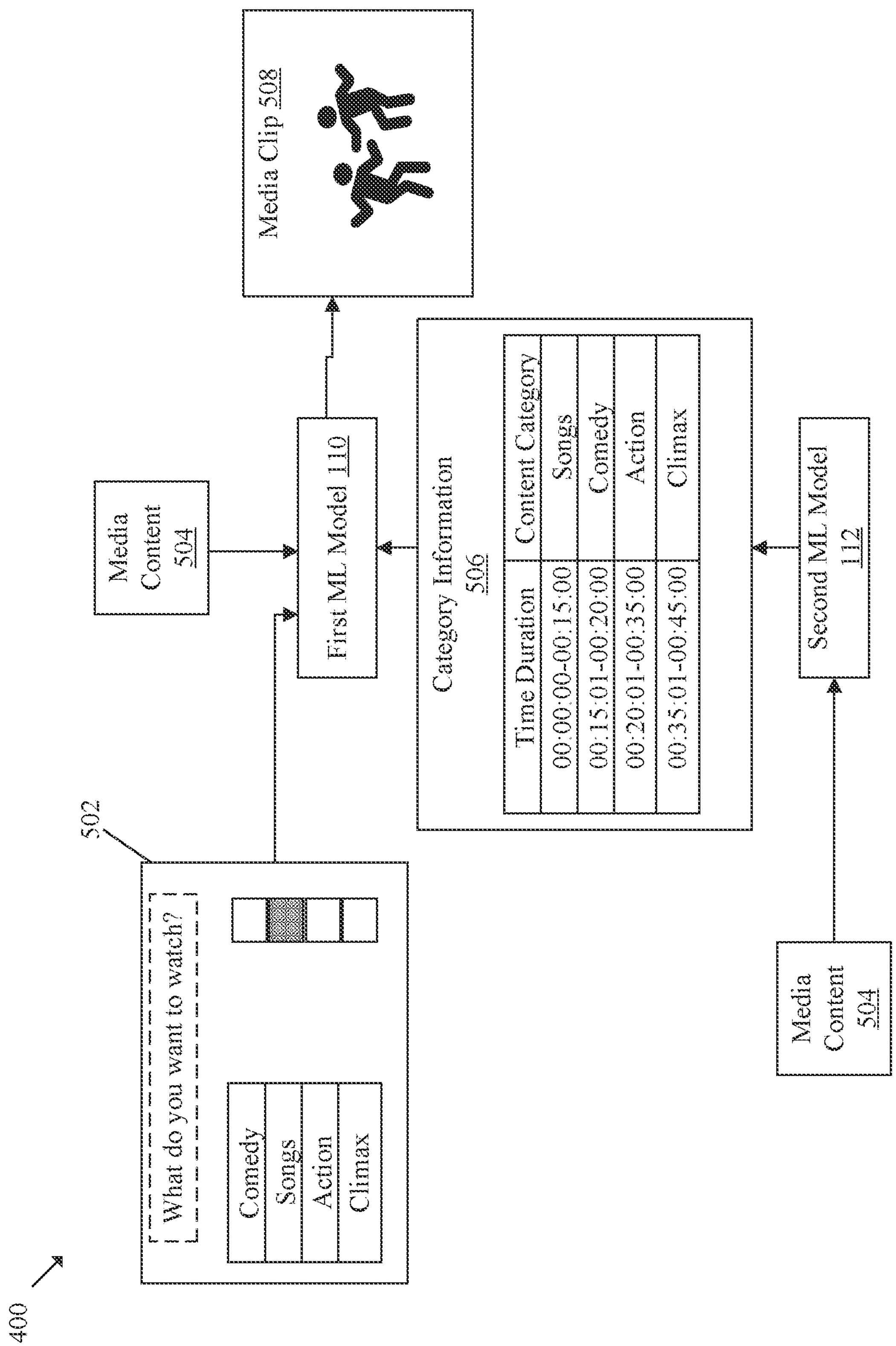
FIG. 5 is a diagram that illustrates an exemplary scenario for generation of a media clip from a media content based on a content category selection, in accordance with an embodiment of the disclosure.

FIG. 5 is a diagram that illustrates an exemplary scenario for generation of a media clip from a media content based on a content category selection, in accordance with an embodiment of the disclosure. FIG. 5 is described in conjunction with elements from FIG. 1, FIG. 2, FIG. 3, and FIG. 4. With reference to FIG. 5, there is shown an exemplary scenario 500. The scenario 500 may include a UI 502, a media content 504, the first ML model 110, the second ML model 112, category information 506, and a media clip 508. A set of operations associated the with scenario 500 is described herein.

With reference to FIG. 5, the circuitry 202 may receive the media content 504. Herein, the received media content 504 may be associated with a movie that can be accessed from an OTT platform. The OTT platform may provide a user interface, such as, the UI 502, that may be rendered on the display device 210. The UI 502 may request the user 116 to select the set of categories that may be of interest to the user 116. With reference to FIG. 5, the UI 502 includes a question "What do you want to watch?". Further, the UI 502 includes a plurality of content categories. The plurality of content categories may include comedy, songs, action, and climax. One or more content categories may be selected from the plurality of content categories based on a user input. The selected one of more content categories may correspond to the set of categories (for example, the set of categories 306A of FIG. 3). For example, with reference to FIG. 5, the content category "songs" may be selected as the set of categories. That is, the user 116 may desire to view only the songs of the received media content 504. The received media content 504 and the set of categories may be provided as an input to the first ML model 110.

With reference to FIG. 5, the received media content 504 may be further provided as an input to the second ML model 112. Based on the application of the second ML model 112 on the received media content 504, the category information 506 for each time duration of the set of time durations associated with the received media content 504 may be determined. The determined category information 506 may state that the content category of a first media portion may be "songs". Herein, a time duration associated with the first media portion may be from a time stamp "00:00:00" to a time stamp "00:15:00" of the received media content 504. The determined category information 506 may further state that the content category of a second media portion may be "comedy". Herein, a time duration associated with the second media portion may be from a time stamp "00:15:01" to a time stamp "00:20:00" of the received media content 504. Similarly, as shown in FIG. 5, the determined category information 506 may indicate that a time duration between "00:20:01" to "00:35:00" may correspond to action scenes and that a time duration between "00:35:01" to "00:45:00" may correspond to climax scenes. The received media content 504, the set of categories, and the determined category information 506 may be provided as an input to the first ML model 110.

In an example, in case the user 116 desires to watch only the songs of the received media content 504, the media clip 508 may be generated based on an exclusion of the second media portion, the third media portion, and the fourth media portion from the media content 504. The generated media clip 508 may be rendered on the display device 210.

It should be noted that the receive media content 504 may have a length of a first time duration. In an embodiment, a second time duration smaller than the first time duration may be received. Herein, the second time duration may be a desired length of the media clip 508 generated from the received media content 504. In such case, the circuitry 202 may generate the media clip 508 further based on the received second time duration.

It should be noted that the media clip 508 generated from the received media content 504 may be thus customized and in accordance with the set of categories. Therefore, a viewing experience of the user 116 may be enhanced.

It should be noted that scenario 500 of FIG. 5 is for exemplary purposes and should not be construed to limit the scope of the disclosure.

Figure 6:
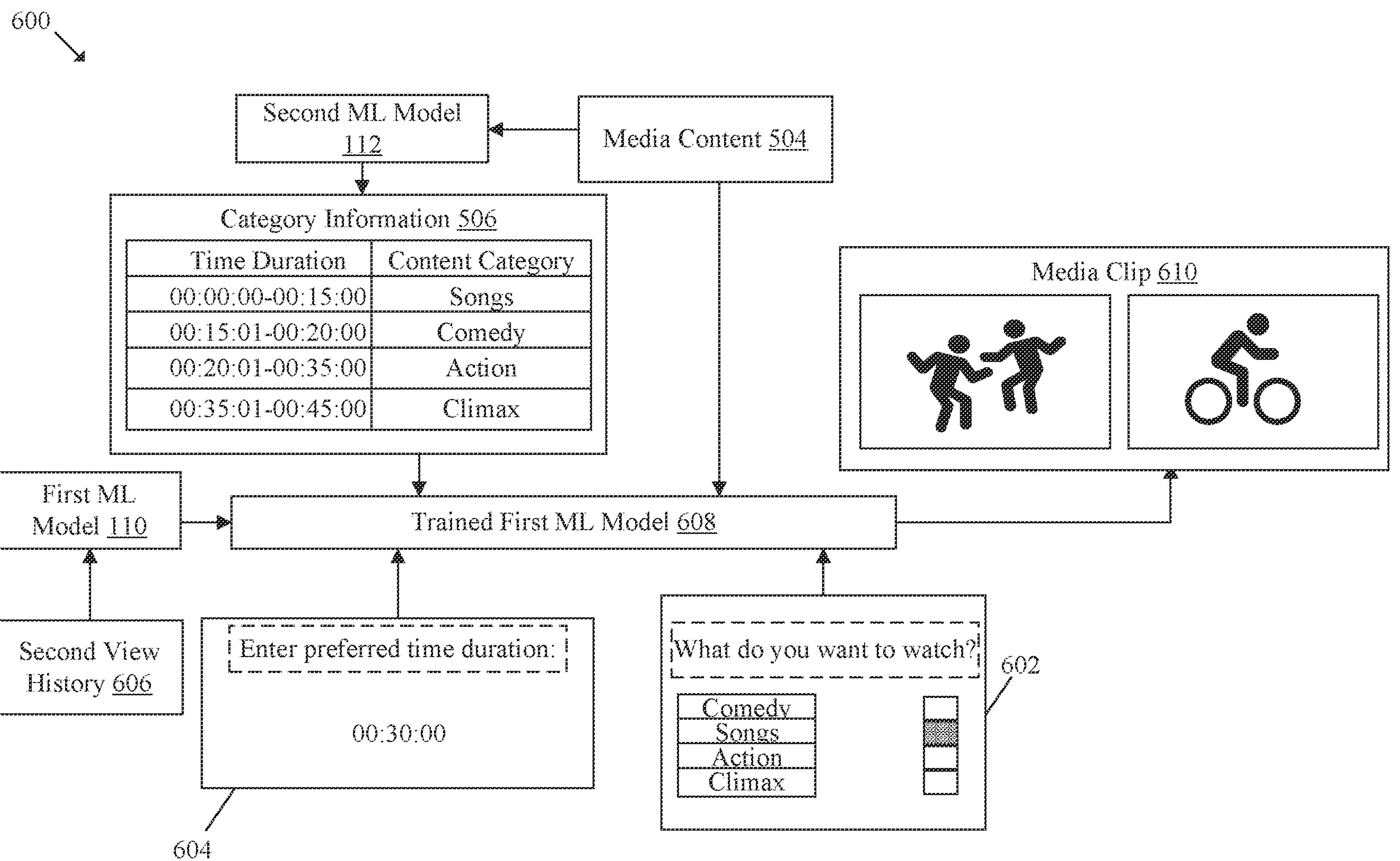
FIG. 6 is a diagram that illustrates an exemplary scenario for content category based media clip generation from a media content using a machine learning (ML) model, in accordance with an embodiment of the disclosure.

FIG. 6 is a diagram that illustrates an exemplary scenario for content category based media clip generation from a media content using a machine learning (ML) model, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The scenario 600 may include a UI 602, a UI 604, a second view history 606, a media clip 610, the media content 504, the first ML model 110, a trained first ML model 608, the second ML model 112, and the category information 506. A set of operations associated the with scenario 600 is described herein.

With reference to FIG. 6, the circuitry 202 may receive media content 504. The UI 602 may be rendered on the display device 210 and may request the user 116 to select the set of categories that may be of interest to the user 116. With reference to FIG. 6, the UI 602 includes a question "What do you want to watch?". Further, the UI 602 includes a plurality of content categories. The plurality of content categories may include comedy, songs, action, and climax. With reference to FIG. 6, in an example, the content category "songs" may be selected as the set of categories. That is, the user 116 may desire to view only the songs of the received media content 504. Details related to the selection of the set of categories are further provided, for example, in FIG. 5.

Upon selection of the set of categories, the UI 604 may be rendered on the display device 210. The UI 604 may request the user 116 to provide a second time duration. Herein, the second time duration may be a customized (i.e., a user-defined) time duration to which the received media content 504 may be required to be clipped. With reference to FIG. 6, as an example, the second time duration may be received as "00:30:00" based on a user input.

With reference to FIG. 6, the second view history 606 of the user 116 may be provided as an input to the first ML model 110. The received second view history 606 may include a set of user navigation details of the user 116 while consumption of a set of media contents. Based, on the received second view history 606 of the user 116, the first ML model 110 may be trained to obtain the trained first ML model 608.

With reference to FIG. 5, the received media content 504 may be further provided as an input to the second ML model 112. Based on the application of the second ML model 112 on the received media content 504, the category information 506 for each time duration of the set of time durations associated with the received media content 504 may be determined. Details related to the category information 506 are further provided, for example, in FIG. 5.

The trained first ML model 608 may be applied on the received media content 504, the set of categories, the determined category information 506, and the second time duration. Based on the application of the trained first ML model 608, the media clip 610 may be generated.

With reference to FIG. 6, in example, the user 116 desires to the watch the received media content 504 within the received second time duration "00:30:00". Moreover, the user 116 may not want to skip songs of the received media content 504. Thus, the media clip 610 may be generated from the received media content 504 based on the received second time duration and the received set of categories. Furthermore, the media clip 610 may be customized based on the received second view history 606. Therefore, a viewing experience of the user 116 may be enhanced.

It should be noted that scenario 600 of FIG. 6 is for exemplary purposes and should not be construed to limit the scope of the disclosure.

FIGS. 7A-7E are diagrams that illustrates an exemplary scenario for generation of media clips of varying second time durations from a received media content, in accordance with an embodiment of the disclosure. FIGS. 7A-7E are described in conjunction with elements from FIG. 1, FIG. 2, FIG. 3, FIG. 4, FIG. 5, and FIG. 6. With reference to FIGS. 7A-7E, there is shown an exemplary scenario 700. The scenario 700 may include a media clip 702A, a media clip 702B, a media clip 702C, a media clip 702D, and a media clip 702E. A set of operations associated the with scenario 700 is described herein.

Figures 7A, 7B, 7C:
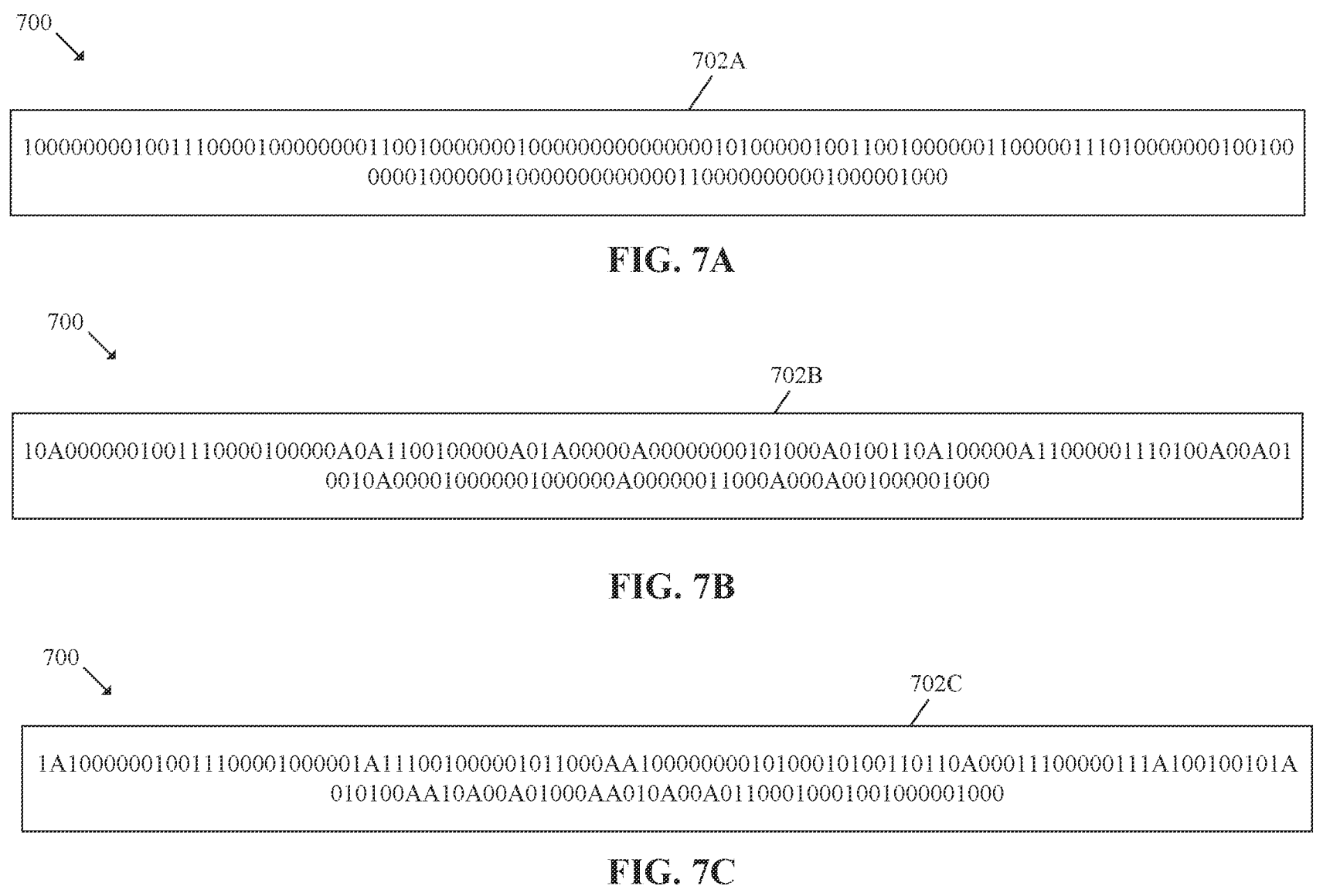
Figure 7D:
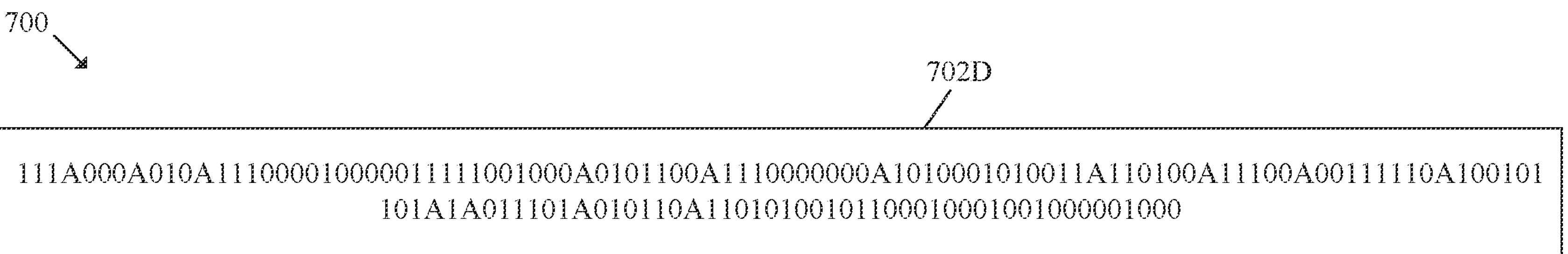

With reference to FIGS. 7A-7E, in an example, the first time duration 302A associated with a media content such as, the media content 114A may be "150" seconds. With reference to FIG. 7A, in an example, the second time duration 304A associated with the media clip 702A may be "30" seconds. The media clip 702A may be generated from the received media content 114A by clipping the received media content 114A from the first time duration 302A of "150" to the second time duration 304A of "30" seconds. Herein, a "0" may indicate a removal of a corresponding media portion and a "1" may indicate a selection of a corresponding media portion from a set of media portions included in the media content 114A.

With reference to FIG. 7B, in an example, the second time duration 304A associated with the media clip 702B may be "45" seconds. The media clip 702B may be generated from the received media content 114A by clipping the received media content 114A from the first time duration 302A of "150" to the second time duration 304A of "45" seconds. Herein, the "0" may indicate removal of a corresponding media portion, and the "1" may indicate selection of a corresponding media portion. Further, an "A" may indicate an addition of a certain media portion in the media clip 702A. That is, the "A" may indicate that the corresponding media portion associated with the received media content 114A may have been added to the media clip 702A to obtain the media clip 702B. However, the media portion designated as "A" may not have been included in the media clip 702A.

Similarly, with reference to FIG. 7C, the second time duration 304A associated with the media clip 702C may be "60" seconds. The media clip 702C may be generated from the received media content 114A by clipping the received media content 114A from the first time duration 302A of "150" to the second time duration 304A of "60" seconds. Herein, an "A" may indicate an addition of a certain media portion in the media clip 702B to obtain the media clip 702C. That is, the "A" may indicate that the corresponding media portion associated with the received media content 114A may have been added to the media clip 702B to obtain the media clip 702C. However, the media portion designated as "A" may not have been included in the media clip 702B.

Similarly, with reference to FIG. 7D, the second time duration 304A associated with the media clip 702D may be "75" seconds. The media clip 702D may be generated from the received media content 114A by clipping the received media content 114A from the first time duration 302A of "150" to the second time duration 304A of "75" seconds. Herein, an "A" may indicate an addition of a certain media portion in the media clip 702C to obtain the media clip 702D. That is, the "A" may indicate that the corresponding media portion associated with the received media content 114A may have been added to the media clip 702C to obtain the media clip 702D. However, the media portion designated as "A" may not have been included in the media clip 702C.

Figure 7E:
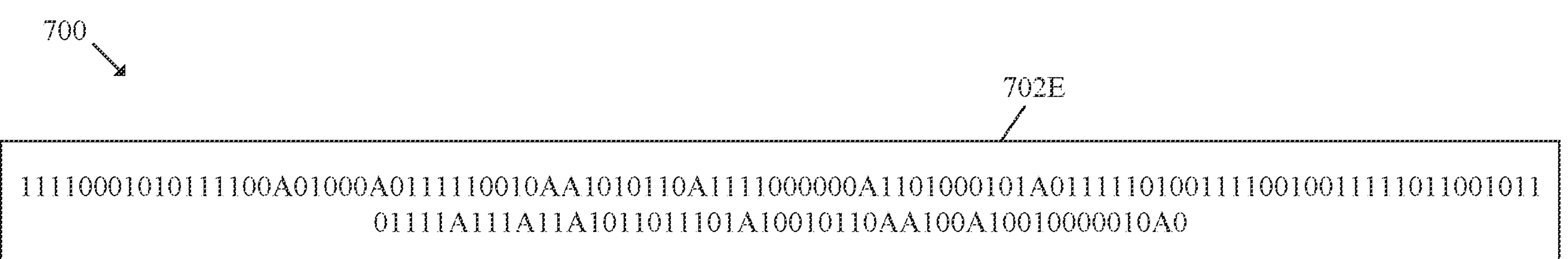

Similarly, with reference to FIG. 7E, the second time duration 304A associated with the media clip 702E may be "90" seconds. The media clip 702E may be generated from the received media content 114A by clipping the received media content 114A from the first time duration 302A of "150" to the second time duration 304A of "90" seconds. Herein, an "A" may indicate an addition of a certain media portion in the media clip 702D to obtain the media clip 702E. That is, the "A" may indicate that the corresponding media portion associated with the received media content 114A may have been added to the media clip 702D to obtain the media clip 702E. However, the media portion designated as "A" may not have been included in the media clip 702D. Thus, with reference to FIGS. 7A-7E, the media clips of varying second time durations may be generated based a choice of the user 116.

It should be noted that scenario 700 of FIGS. 7A-7E is for exemplary purposes and should not be construed to limit the scope of the disclosure.

Figure 8:
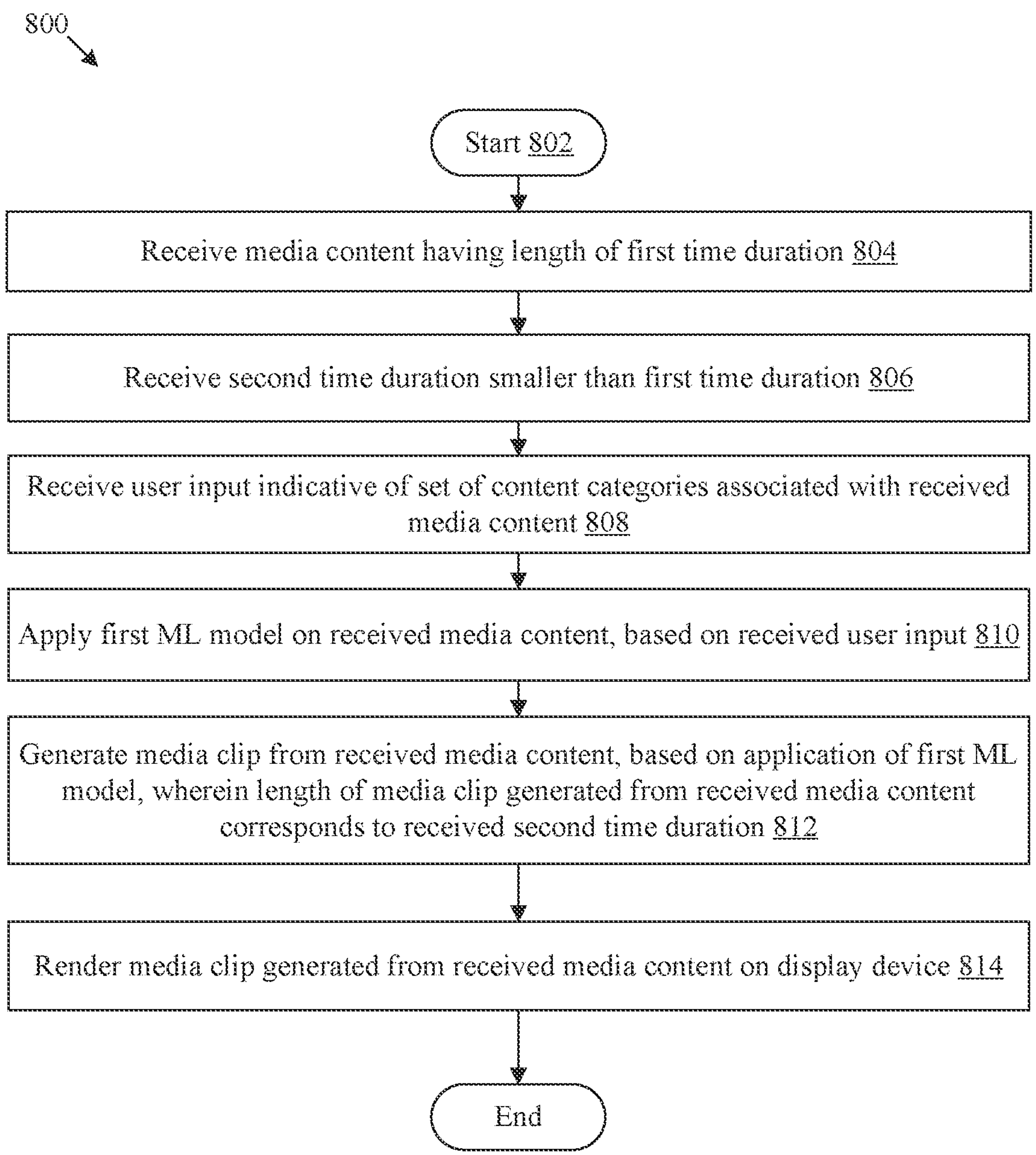
FIG. 8 is a flowchart that illustrates operations of an exemplary method for content category based media clip generation from a media content using a machine learning (ML) model, in accordance with an embodiment of the disclosure.

FIG. 8 is a flowchart that illustrates operations of an exemplary method for content category based media clip generation from a media content using a machine learning (ML) model, in accordance with an embodiment of the disclosure. FIG. 8 is described in conjunction with elements from FIG. 1, FIG. 2, FIG. 3, FIG. 4, FIG. 5, FIG. 6, FIG. 7A, FIG. 7B, FIG. 7C, FIG. 7D, and FIG. 7E. With reference to FIG. 8, there is shown a flowchart 800. The flowchart 800 may include operations from 802 to 814 and may be implemented by the electronic device 102 of FIG. 1 or by the circuitry 202 of FIG. 2. The flowchart 800 may start at 802 and proceed to 804.

At 804, the media content 114A having the length of the first time duration 302A may be received. The circuitry 202 may be configured to receive the media content 114A having the length of the first time duration 302A. Details related to the reception of the media content 114A are further described, for example, in FIG. 3 (at 302).

At 806, the second time duration 304A smaller than the first time duration may be received. The circuitry 202 may be configured to receive the second time duration 304A smaller than the first time duration 302A. Details related to the reception of the second time duration 304A are further described, for example, in FIG. 3 (at 304).

At 808, the user input indicative of the set of categories 306A associated with the received media content 114A may be received. The circuitry 202 may be configured to receive the user input indicative of the set of categories 306A associated with the received media content 114A. Details related to the reception of the user input are further described, for example, in FIG. 3 (at 306).

At 810, the first ML model 110 may be applied on the received media content 114A, based on the received user input. The circuitry 202 may be configured to apply the first ML model 110 on the received media content 114A, based on the received user input. Details related to the application of the first ML model 110 are further described, for example, in FIG. 3 (at 308).

At 812, the media clip 310A may be generated from the received media content 114A, based on the application of the first ML model 110, wherein the length of the media clip 310A generated from the received media content 114A may correspond to the received second time duration 304A. The circuitry 202 may be configured to generate the media clip 310A from the received media content 114A, based on the application of the first ML model 110. In an embodiment, the length of the media clip 310A generated from the received media content 114A may correspond to the received second time duration 304A. Details related to the generation of the media clip 310A are further described, for example, in FIG. 3 (at 310).

At 814, the media clip 310A generated from the received media content may be rendered on the display device 210. The circuitry 202 may be configured to render the media clip 310A generated from the received media content on the display device 210. Details related to the rendering of the media clip 310A are further described, for example, in FIG. 3 (at 310). Control may pass to end.

Although the flowchart 800 is illustrated as discrete operations, such as, 804, 806, 808, 810, 812, and 814, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a media content (such as, the media content 114A) having a length of a first time duration (e.g., the first time duration 302A). The operations may further include reception of a second time duration (e.g., the second time duration 304A) smaller than the first time duration 302A. The operations may further include reception of the user input indicative of the set of content categories associated with the received media content 114A. The operations may further include application of a first ML model (e.g., the first ML model 110) on the received media content 114A, based on the received user input. The operations may further include generation of a media clip (e.g., the media clip 310A) from the received media content 114A, based on the application of the first ML model 110. The length of the media clip 310A generated from the received media content 114A may correspond to the received second time duration 304A. The operations may further include rendering the media clip 310A generated from the received media content on a display device (e.g., the display device 210).

Exemplary aspects of the disclosure may provide an electronic device (such as, the electronic device 102 of FIG. 1) that includes circuitry (such as, the circuitry 202). The circuitry 202 may be configured to receive a media content (such as, the media content 114A) having the length of a first time duration (e.g., the first time duration 302A). The circuitry 202 may be configured to receive a second time duration (e.g., the second time duration 304A) smaller than the first time duration 302A. The circuitry 202 may be configured to receive the user input indicative of the set of content categories associated with the received media content 114A. The circuitry 202 may be configured to apply a first ML model (e.g., the first ML model 110) on the received media content 114A, based on the received user input. The circuitry 202 may be configured to generate a media clip (e.g., the media clip 310A) from the received media content 114A, based on the application of the first ML model 110. The length of the media clip 310A generated from the received media content 114A may correspond to the received second time duration 304A. The circuitry 202 may be configured to render the media clip 310A generated from the received media content on a display device (e.g., the display device 210).

In an embodiment, the circuitry 202 may be further configured to receive the category information for each time duration of the set of time durations associated with the received media content 114A. The combination of each time duration of the set of time durations may correspond to the first time duration 302A of the received media content 114A. The generation of the media clip 310A from the received media content 114A may be further based on the determined category information.

In an embodiment, the circuitry 202 may be further configured to apply a second ML model (e.g., the second ML model 112) on the received media content 114A. The circuitry 202 may be further configured to determine the category information for each time duration of the set of time durations associated with the received media content 114A based on the application of the second ML model 112. The generation of the media clip 310A from the received media content 114A may be further based on the determined category information.

In an embodiment, the category information may include the content category for each time duration of the set of time durations. The content category may be at least one of the humor, the title card, the end credit, the song, or the action.

In an embodiment, the circuitry 202 may be further configured to receive a first view history associated with the set of users for the received media content 114A. The received first view history may include the set of user navigation details of the set of users while consumption of the received media content 114A. The generation of the media clip 310A from the received media content 114A may be further based on the received first view history of the received media content 114A.

In an embodiment, the circuitry 202 may be further configured to determine one or more popular time durations of the received media content 114A based on the received first view history of the received media content 114A. The circuitry 202 may be further configured to render the determined one or more popular time durations on the display device 210. The reception of the second time duration 304A may be further based on the rendering of the determined one or more popular time durations.

In an embodiment, the circuitry 202 may be further configured to receive a second view history of a first user (e.g., the user 116) for the set of media contents. The received second view history may include the set of user navigation details of the first user while consumption of the set of media contents. The circuitry 202 may be further configured to train the first ML model 110 based on the received the second view history of the first user. The trained first ML model 110 may be further applied on the received media content 114A.

In an embodiment, the circuitry 202 may be further configured to receive the first view history of the set of users for the received media content 114A. The received first view history 402 may include the set of user navigation details associated with the set of users while consumption of the received media content 114A. The circuitry 202 may be further configured to receive the second view history 404 of the first user for the set of media contents, wherein the received second view history 404 of the first user may include the set of user navigation details associated with the first user while consumption of the set of media contents. The circuitry 202 may be further configured to determine the set of parameters associated with the first user based on the received second view history of the first user. The circuitry 202 may be further configured to determine the weight information associated with the received first view history of the set of users for the received media content 114A, based on the determined set of parameters. The generation of the media clip 310A from the received media content 114A may be further based on the determined weight information.

In an embodiment, the circuitry 202 may be further configured to the set of parameters associated with the first user includes at least one of the media consumption behavior of the first user, the gender of the first user, the age of the first user, or the location of the first user.

In an embodiment, the generation of the media clip 310A from the received media content 114A may be further based on at least one of a selection of the media portion from the received media content 114A, a removal of the media portion from the received media content 114A, a fast-forwarding of the media portion of the received media content 114A, or a rewinding of the media portion of the received media content 114A.

In an embodiment, the circuitry 202 may be further configured to determine a description of the media portion of the received media content 114A. The circuitry 202 may be further configured to determine embed the determined description in the media clip 310A generated from the received media content 114A.

In an embodiment, the description of the media portion may be at least one of the textual description or the audio description of the removed media portion.

In an embodiment, the media portion may correspond to the portion of the received media content 114A that may be excluded in the media clip 310A generated from the received media content 114A.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
circuitry configured to:
receive media content having a length of a first time duration;
receive a second time duration smaller than the first time duration;
determine a description of a first media portion of the received media content;
receive a user input indicative of a set of content categories associated with the received media content;
apply a first machine learning (ML) model on the received media content, based on the received user input;
generate a media clip from the received media content, based on the application of the first ML model, wherein
the first media portion is a portion of the received media content that is excluded in the media clip generated from the received media content,
the description of the first media portion is an audio description of the excluded portion of the received media content,
a first amplitude of the audio description of the excluded portion is smaller than a second amplitude of audio associated with the generated media clip, and
a length of the media clip generated from the received media content corresponds to the received second time duration; and
display the media clip, generated from the received media content, on a display device.

2. The electronic device according to claim 1, wherein the circuitry is further configured to:
receive category information for each time duration of a set of time durations associated with the received media content, wherein
a combination of each time duration of the set of time durations corresponds to the first time duration of the received media content, and
the generation of the media clip from the received media content is further based on the received category information.

3. The electronic device according to claim 1, wherein the circuitry is further configured to:
apply a second ML model on the received media content; and
determine category information for each time duration of a set of time durations, associated with the received media content, based on the application of the second ML model, wherein
the generation of the media clip from the received media content is further based on the determined category information.

4. The electronic device according to claim 3, wherein
the category information includes a content category for each time duration of the set of time durations, and
the content category is at least one of humor, title card, end credit, song, or action.

5. The electronic device according to claim 1, wherein the circuitry is further configured to:
receive a first view history associated with a set of users for the received media content, wherein
the received first view history includes a set of user navigation details of the set of users while consumption of the received media content, and
the generation of the media clip from the received media content is further based on the received first view history of the received media content.

6. The electronic device according to claim 5, wherein the circuitry is further configured to:
determine at least one popular time duration of the received media content based on the received first view history of the received media content; and
display the determined at least one popular time duration on the display device, wherein
the reception of the second time duration is further based on the display of the determined at least one popular time duration.

7. The electronic device according to claim 1, wherein the circuitry is further configured to:
receive a second view history of a first user for a set of media contents, wherein
the received second view history includes a set of user navigation details of the first user while consumption of the set of media contents, and
the set of media contents includes the received media content; and
train the first ML model based on the received second view history of the first user, wherein
the trained first ML model is further applied on the received media content.

8. The electronic device according to claim 1, wherein the circuitry is further configured to:
receive a first view history of a set of users for the received media content, wherein
the received first view history includes a set of user navigation details associated with the set of users while consumption of the received media content;
receive a second view history of a first user for a set of media contents, wherein the received second view history of the first user includes a set of user navigation details associated with the first user while consumption of the set of media contents, and the set of media contents includes the received media content;

determine a set of parameters associated with the first user based on the received second view history of the first user; and determine weight information, associated with the received first view history of the set of users for the received media content, based on the determined set of parameters, wherein the generation of the media clip from the received media content is further based on the determined weight information.

9. The electronic device according to claim 8, wherein the set of parameters associated with the first user includes at least one of a media consumption behavior of the first user, a gender of the first user, an age of the first user, or a location of the first user.

10. The electronic device according to claim 1, wherein the generation of the media clip from the received media content is further based on at least one of:

a selection of a second media portion from the received media content, a removal of the second media portion from the received media content, a fast-forwarding of the second media portion of the received media content, or a rewinding of the second media portion of the received media content.

11. The electronic device according to claim 1, wherein the circuitry is further configured to embed the determined description in the media clip generated from the received media content.

12. The electronic device according to claim 11, wherein the description of the first media portion corresponds to a textual description of the excluded portion.

13. A method, comprising:

in an electronic device:

receiving media content having a length of a first time duration;

receiving a second time duration smaller than the first time duration;

determining a description of a first media portion of the received media content;

receiving a user input indicative of a set of content categories associated with the received media content;

applying a first machine learning (ML) model on the received media content, based on the received user input;

generating a media clip from the received media content, based on the application of the first ML model, wherein the first media portion is a portion of the received media content that is excluded in the media clip generated from the received media content, the description of the first media portion is an audio description of the excluded portion of the received media content, a first amplitude of the audio description of the excluded portion is smaller than a second amplitude of audio associated with the generated media clip, and a length of the media clip generated from the received media content corresponds to the received second time duration; and displaying the media clip generated from the received media content on a display device.

14. The method according to claim 13, further comprising:

receiving category information for each time duration of a set of time durations associated with the received media content, wherein a combination of each time duration of the set of time durations corresponds to the first time duration of the received media content, and the generation of the media clip from the received media content is further based on the received category information.

15. The method according to claim 13, further comprising:

applying a second ML model on the received media content; and determining category information for each time duration of a set of time durations associated with the received media content based on the application of the second ML model, wherein the generation of the media clip from the received media content is further based on the determined category information.

16. The method according to claim 13, further comprising:

receiving a first view history associated with a set of users for the received media content, wherein the received first view history includes a set of user navigation details of the set of users while consumption of the received media content, and the generation of the media clip from the received media content is further based on the received first view history of the received media content.

17. The method according to claim 16, further comprising:

determining at least one popular time duration of the received media content based on the received first view history of the received media content; and displaying the determined at least one popular time duration on the display device, wherein the reception of the second time duration is further based on the display of the determined at least one popular time duration.

18. The method according to claim 13, further comprising:

receiving a second view history of a first user for a set of media contents, wherein the received second view history includes a set of user navigation details of the first user while consumption of the set of media contents, and the set of media contents includes the received media content; and training the first ML model based on the received second view history of the first user, wherein the trained first ML model is further applied on the received media content.

19. A non-transitory computer-readable medium having stored thereon, computer-executable instructions that when executed by an electronic device, causes the electronic device to execute operations, the operations comprising:

receiving media content having a length of a first time duration;

receiving a second time duration smaller than the first time duration;

determining a description of a first media portion of the received media content;

receiving a user input indicative of a set of content categories associated with the received media content;

applying a first machine learning (ML) model on the received media content, based on the received user input;

generating a media clip from the received media content, based on the application of the first ML model, wherein the first media portion is a portion of the received media content that is excluded in the media clip generated from the received media content, the description of the first media portion is an audio description of the excluded portion of the received media content, a first amplitude of the audio description of the excluded portion is smaller than a second amplitude of audio associated with the generated media clip, and a length of the media clip generated from the received media content corresponds to the received second time duration; and displaying the media clip generated from the received media content on a display device.

* * * * *